Patented Apr. 7, 1931

1,799,420

UNITED STATES PATENT OFFICE

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO

DESTRUCTIVELY-DISTILLED CASTOR-OIL CONDENSATION PRODUCT AND PROCESS OF MAKING THE SAME

No Drawing.  Application filed December 14, 1928. Serial No. 326,156.

This invention relates to paint, varnish and lacquer bases and methods of producing the same and has for one of its objects the utilization of what has heretofore been a more or less waste material.

A further object is to produce a base that is dependable and may be used in place of some of the bases now commercially used for producing high gloss enamel paint and other classes of paints, varnishes and enamels having desirable characteristics.

According to Lewkowitsch, in his work entitled "Chemical Technology and Analysis, Oils, Fats & Waxes", vol. 2, p. 331, the destructive distillation of castor oil, in the manufacture of cognac oil, produces a residue which solidifies to a very bulky, spongy, india-rubber-like mass for which a solvent has not been found. This residue is thought to be the anhydride of triundecylenic acid $(C_{11}H_{20}O_2)_3 - H_2O$.

When the distillation is stopped just before this insoluble compound is formed the oily residue has a composition of $C_{105}H_{184}O_{18}$ which has been supposed to be the glyceride of the dibasic triundecylenic acid

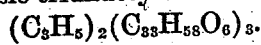

$(C_3H_5)_2(C_{33}H_{58}O_6)_3$.

It is highly improbable that the foregoing formulæ, as given by Lewkowitsch, completely represent the composition of the various compounds formed when castor oil is destructively distilled, yet in a general way they may be accepted as representing, somewhat imperfectly, the type of reaction which takes place.

I have found that when the distillation is stopped before the insoluble compound is formed, and the oily residue in the retort is dissolved in spirits of turpentine or other paint solvent, the product may be used in paint, varnish and lacquer mixtures. When thus used in such mixtures, great care must be exercised since it reacts readily with zinc oxide and the oxides of lead, calcium, magnesium and some other substances.

To a certain extent this reaction with zinc oxide may be considered beneficial since it causes a thickening and produces a sort of high gloss enamel paint. However, this has been rather difficult to control and it has been the object of my invention to produce a dependable paint, varnish and lacquer base medium from castor oil by heating the same until a definite amount of cognac oil has been distilled off.

The residue remaining in the still is next esterified by heating with an excess of a polyhydric alcohol and is next further condensed by heating with a polybasic acid or anhydride thereof.

The resulting product may be considered as a condensation product of the esters of undecylenic acid and its polymers with polyhydric alcohols and polybasic acids or anhydrides of such acids.

When carefully prepared it is usually liquid at temperatures above 100° C. At temperatures between 100° C. and 20° it usually ranges from liquid to solid and below 20° it is usually solid. Since it is possible to carry on this reaction with the esters of undecylenic acid and their polymers with a wide variety of polyhydric alcohols and polybasic acids, products may be obtained which are liquid at temperatures below 20° C. and other products may be obtained which are solid at temperatures around 100° C. and liquefy at higher temperatures.

These condensation products in some instances may be fused with resins or oil-resin mixtures or they may be dissolved in ordinary paint, varnish and lacquer solvents and the solutions thus produced may be used in the ordinary way in the manufacture of paints, varnishes and lacquers.

Having thus described my invention in a general way, I will now give a few specific examples.

One thousand parts by weight of castor oil are destructively distilled until the residue of polymeric esters remaining in the retort weighs 740 parts.

The retort is now cooled to temperatures below 290° C. and 800 parts of glycerine are gradually introduced.

After heating for a short time at temperatures well above the boiling point of water but below the boiling point of glycerine, 1,200 parts of phthalic anhydride are gradually added, temperature being maintained about midway between the boiling point of phthalic anhydride and that of water. When the reaction has proceeded to the optimum degree, which is indicated by the first appearance of clarity and homogeneity in place of turbidity and heterogeneity, the mixture is run into cooling pans to cool, or into mixing tanks to be thinned with the proper solvent mixtures which vary somewhat according to the use to which the product is to be put.

By varying the proportions of polymeric esters of undecylenic acid, glycerine and phthalic acid anhydride the physical properties of the resulting compounds are varied. A lessening of undecylenic esters gives a harder product while an increase of undecylenic esters produces a softer compound.

Also by the use of other polyhydric alcohols and other polybasic acids along with the esters of undecylenic acid, and its polymers products of harder or softer consistency may be obtained.

In the specific example given, the distillation of the castor oil is carried on until the distillate is about 26% by weight of the original castor oil and the polymeric esters are about 74% by weight of the original oil. I do not wish to limit myself to these proportions since the distillation may be carried much further and still yield a usable product. However, since there is a tendency for these undecylenic compounds to discolor as the distillation progresses, I usually prefer to stop the distillation within a range of 20% to 30% of distillate, especially when the distillation is carried on at atmospheric pressures. There are some advantages in the use of reduced pressures during distillation, especially if a light colored product is much desired; and under these conditions I prefer to use some commercial form of vacuum pump with suitable condenser for the recovery of the valuable distillate.

In the specific example given the order of procedure is to esterify with glycerine before condensing with phthalic anhydride. This is the preferable method but I do not wish to limit myself to this order of procedure since by the exercise of care it is possible to obtain a usable product if the phthalic acid anhydride is added before the glycerine or simultaneously with the glycerine.

Having thus described my invention, what I claim is:

1. The steps of the hereindescribed method which consists in destructively distilling castor oil until the residue is from sixty to eighty per cent of the original weight of the castor oil and then heating such residue with a polyhydric alcohol.

2. The steps of the hereindescribed method which consist in heating the residue, derived from the procedure according to claim 1, with addition of a polybasic acid or acid anhydride until condensation takes place and the mass becomes homogeneous, clear and almost tranquil.

3. The steps of the hereindescribed method which consist in destructively distilling castor oil until the residue is from sixty to eighty per cent of the original weight of the castor oil and heating the residue with the addition of glycerine and phthalic anhydride.

4. The steps of the hereindescribed method which consist in destructively distilling castor oil until the residue is from sixty to eighty per cent of the original weight of the castor oil and heating the residue with the addition of one-half to three times its weight of glycerine until the esterifiable constituents of the residue are substantially esterified.

5. The hereindescribed method which consists in destructively distilling castor oil until the residue is from sixty to eighty per cent of the original weight of the castor oil, heating the residue with the addition of one-half to three times its weight of glycerine until the esterifiable constituents of the residue are substantially esterified, and then heating the product thus obtained with from three-fourths to five times the weight, of said residue, of phythalic anhydride until condensation takes place and the mass becomes homogeneous, clear and almost tranquil.

6. The material produced by the method defined in claim 5.

7. The material produced by the method defined in claim 2.

In testimony whereof, I hereunto affix my signature.

EDWARD C. HOLTON.